(12) United States Patent
Antongirolami et al.

(10) Patent No.: US 10,205,382 B2
(45) Date of Patent: Feb. 12, 2019

(54) METHOD AND DEVICE FOR REGULATING A DEAD TIME IN SWITCHING POWER SUPPLY UNITS

(71) Applicant: CONTI TEMIC MICROELECTRONIC GMBH, Nuremberg (DE)

(72) Inventors: Diego Antongirolami, Nuremberg (DE); Goeran Schubert, Schwabach (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/504,346

(22) PCT Filed: Jun. 10, 2015

(86) PCT No.: PCT/EP2015/062962
§ 371 (c)(1),
(2) Date: Feb. 16, 2017

(87) PCT Pub. No.: WO2016/026594
PCT Pub. Date: Feb. 25, 2016

(65) Prior Publication Data
US 2017/0237337 A1    Aug. 17, 2017

(30) Foreign Application Priority Data
Aug. 20, 2014    (DE) ........................ 10 2014 216 551

(51) Int. Cl.
*H02M 1/38*    (2007.01)
*H02M 3/158*    (2006.01)

(52) U.S. Cl.
CPC .......... *H02M 1/38* (2013.01); *H02M 3/1588* (2013.01); *Y02B 70/1466* (2013.01)

(58) Field of Classification Search
CPC .................. H02M 3/158–3/1588; H02M 1/38
See application file for complete search history.

(56) References Cited

U.S. PATENT DOCUMENTS 6,294,954 B1    9/2001    Melanson
6,614,208 B2    9/2003    Narita
(Continued)

FOREIGN PATENT DOCUMENTS

JP    2001258269 A    9/2001
JP    2007129853 A    5/2007
(Continued)

*Primary Examiner* — Gary L Laxton
*Assistant Examiner* — Peter Novak
(74) *Attorney, Agent, or Firm* — Laurence A. Greenberg; Werner H. Stemer; Ralph E. Locher

(57) ABSTRACT

A method for adapting a dead time between the beginning of ab opening process of a first switching element and the beginning of a closing process of a second, serially connected switching element in a switching regulator of a switching power supply unit. The method includes the following steps: a measurement voltage across the second switching element is measured, and the dead time is varied such that the deviation of the measured measurement voltage from a target value of the measurement voltage is minimized or limited. The first and second switching elements are actuated using the thus ascertained dead time. There is also described a device for carrying out such a method. The device includes a measuring unit, a processing unit, and a control unit.

13 Claims, 6 Drawing Sheets

(56) References Cited

U.S. PATENT DOCUMENTS

| | | |
|---|---|---|
| 8,836,299 B2 | 9/2014 | Tai et al. |
| 2001/0036085 A1 | 11/2001 | Narita |
| 2006/0007713 A1 | 1/2006 | Brown |
| 2006/0152204 A1 | 7/2006 | Maksimovic et al. |
| 2006/0164867 A1 | 7/2006 | Dikken et al. |
| 2008/0278125 A1 | 11/2008 | Pigott |
| 2014/0167722 A1 | 6/2014 | Lee |

FOREIGN PATENT DOCUMENTS

| | | |
|---|---|---|
| JP | 2012257450 | 12/2012 |
| WO | 0122585 A1 | 3/2001 |

METHOD AND DEVICE FOR REGULATING A DEAD TIME IN SWITCHING POWER SUPPLY UNITS

BACKGROUND OF THE INVENTION

Field of the Invention

The invention relates to a method and a device for the definition and/or adjustment, specifically the regulation and/or control of the dead time between the opening of a first switching element and the closing of a second switching element in a switching power supply unit with active freewheeling.

Many switching power supply units for converting a DC input voltage into a supply voltage incorporate active freewheeling, wherein a first switching element is serially-connected to a second switching element, and the second switching element assumes the active freewheeling function. The DC input voltage is supplied to the switching controller. In parallel with the second switching element, an inductance is serially-connected to a capacitance. An output voltage or measuring voltage is tapped from the second switching element. The supply voltage for the supply of a consumer is tapped from the capacitance. The first and second switching elements are periodically opened and closed, whereby at least one of the switching elements is open at any time. The ratio of the closing time of the first switching element to the total duration of the closing time and the subsequent opening time of the first switching element is described as the pulse duty factor. Using the pulse duty factor, for a given DC input voltage and a given electrical consumer which is parallel-connected to the capacitance, a required supply voltage can be set. Various forms of this basic switching power supply unit with active freewheeling, such as step-down converters or buck converters, will be known to a person skilled in the art.

The time interval from the opening of the first switching element to the closing of the second switching element, during which both switching elements are thus open, is described as "dead time".

Switching elements can be configured as transistors, for example as metal oxide field effect transistors (MOSFETs). By design, MOSFETs of this type cannot execute abrupt, i.e. infinitesimally brief switching operations, but require a certain time to open and close, dictated by their production technology and geometry, ranging from a few tenths of a nanosecond up to a few nanoseconds. Moreover, technology dictates that MOSFETs incorporate parasitic diodes between a drain terminal and a source terminal. A parasitic diode of this type on the second switching element acts in parallel with the series circuit formed by the inductance and the capacitance, from which the supply voltage is tapped.

By its manufacture, on the grounds of the filamentary, or at least elongated metal connections between the components, a switching controller of this type constitutes a stray inductance. As a result of the recovery behavior of the parasitic diode on the second switching element, this stray inductance, depending upon the response time of the switching elements, the DC input voltage and the electrical consumer which is parallel-connected to the capacitance, in the event of an excessive dead time between switching operations, resonance phenomena can occur, such that the output voltage or measuring voltage, and thus also the supply voltage, is subject to the superimposition of voltage spikes. These voltage spikes can be observed as a short-term overvoltage. The short-term overvoltage, and a resulting short-term overcurrent, result in an undesirably high electrical emission.

Moreover, in the event of an excessively short dead time, the switch-out phase of the first switching element and the switch-in phase of the second switching element can overlap. An overlap of this type will also result initially in an overvoltage on the measuring output of the switching controller. A further reduction of the dead time can result in a high short-circuit current in both switching elements, potentially leading to the destruction of the switching elements.

SUMMARY OF THE INVENTION

The object of the invention is the disclosure of a method for defining and/or adjusting the dead time of a switching controller with active freewheeling in a switching power supply unit, which prevents overvoltage and/or destruction. A further object of the invention is the disclosure of a device for executing the method.

In the method according to the invention, this object is fulfilled by the characteristics of the claimed method. In the device according to the invention, this object is fulfilled by the characteristics of the claimed device.

Advantageous embodiments of the invention are the subject of the sub-claims.

In the method according to the invention for determining and/or adjusting a dead time between the start of opening of a first switching element and the start of closing of a series-connected second switching element in a switching controller of a switching power supply unit with active freewheeling, a measuring voltage of the switching power supply unit is determined via the second switching element, and a dead time is varied with reference to the determined measuring voltage, such that the deviation of the measuring voltage determined from a target value is minimized or limited. The first and second switching elements in the switching controller of the switching power supply unit with active freewheeling are controlled such that the closing of the second switching element following the opening of the first switching element is delayed by the dead time determined.

The method according to the invention can be executed by the closed regulation or control of dead time, wherein the multiple determination or adjustment of dead time proceeds in a loop.

One embodiment of the method according to the invention involves:
  in a first step, initialization of a dead time, initialization of a first overvoltage value of the measuring voltage, with an overvoltage start value greater than or equal to the maximum measurable overvoltage, and initialization of a positive corrective direction for dead time adjustment,
  in a second step, measurement of a second overvoltage value within a measuring time window which is tailored to the dead time,
  in a third step, reversal of the corrective direction, if the second overvoltage value is greater than the first overvoltage value,
  in a fourth step, adjustment of the dead time value, in the corrective direction, by a dead time adjustment, and
  in a fifth step, overwriting of the first overvoltage value by the second overvoltage value.

Optionally, the method can be extended by repeating the sequence of steps two to five. For a negative corrective direction, the dead time value is decreased by the dead time adjustment whereas, for a positive corrective direction, the dead time value is increased by the dead time adjustment. The dead time adjustment can be predefined as a fixed dead time adjustment increment.

In the first step, the dead time is set to an initial value, which is sufficiently large to prevent any short-circuit current associated with the overlap of the opening and closing of the first and second switching elements. It is possible to initialize the dead time value to a standard dead time value which, for consumers which are typically connected to the switching controller, is known to bring about no or no significant overshoot of the measuring voltage, and thus also of the supply voltage.

In the first step, the corrective direction is further initialized as a positive corrective direction such that, upon the occurrence of an overvoltage, the dead time value is increased by the dead time adjustment increment.

The first overvoltage value is initialized to an overvoltage start value. Such an overvoltage start value can be defined, for example, as the maximum representable or maximum storable overvoltage value.

In the second step, the measuring voltage measured with the present dead time setting is determined as a second overvoltage value in a measuring time window which is tailored to the dead time.

To this end, a circuit known to a person skilled in the art as a sample-and-hold device or an S&H circuit can be used, which can be operated by a trigger signal derived from the switching element control signals. The measuring voltage can thus be measured, for example, at a time which is approximately set at the mid-point of the dead time.

As a second overvoltage value, however, it is also possible to determine the maximum value of the voltage characteristic on the measuring output of the switching controller over a preset time, for example the time interval commencing upon, or immediately after the opening of the first switching element.

In the third step, the second overvoltage value is compared with the first overvoltage value. If the second overvoltage value is lower than the first overvoltage value, the corrective direction is maintained. Otherwise, the corrective direction is reversed.

In the fourth step, the dead time is corrected in the corresponding corrective direction by the predetermined dead time adjustment increment, and is thus increased in case of a positive corrective direction, and decreased in case of a negative corrective direction.

In the fifth step, the second, i.e. the last-measured overvoltage value is delivered as a reference value for the first overvoltage value, and is thus available for comparison with a subsequent and yet to be measured overvoltage value during a subsequent cycle for the execution of the second to fifth steps.

If the third step is executed for the first time, the second overvoltage value measured in the second step never exceeds the first overvoltage value, which has been initialized in the first step to the maximum overvoltage start value. It is thus ensured, for the first execution of the third step, that the initialized positive corrective direction is maintained.

For subsequent executions of the third step, conversely, the corrective direction from the previous execution is specifically maintained, if said corrective direction has produced a reduction in the overvoltage, and thus an improvement in the behavior of the switching controller. In all other cases, the corrective direction is changed.

By this method, advantageously, dead time values are determined which oscillate around an at least locally optimum dead time value, which is characterized by an at least locally minimum overvoltage value for the measuring voltage. In other words: dead time values which lie outside, but in the immediate vicinity of the dead time value oscillation range would generate larger overvoltage values for the measuring voltage. The method described thus minimizes any disadvantageous overvoltage.

For practical purposes, by way of an approximation, it can be assumed that, between a high overvoltage value associated with an excessively short dead time, resulting in a short-circuit current, and a high overvoltage value associated with an excessively long dead time, resulting in an overshoot, a dead time value lies which results in an optimum measuring voltage, i.e. which does not exceed the target measuring voltage or is only minimally increased in relation thereto, during the switchover of the first and second switching elements.

In this practical, and particularly meaningful approximation, the method generates dead time values which oscillate in the immediate vicinity of the optimum dead time, thereby resulting in a minimal overvoltage value.

This is particularly advantageous in case of variations in the current load take-up of one of the consumers supplied by the switching power supply unit, or variations in the impedance, specifically the capacitive impedance element of such a consumer. Variations of this type generally require an adjusted optimum dead time value for the purposes of overvoltage minimization. By the method according to the invention, such an adjusted optimum dead time value can be determined, at least by approximation.

In a further form of embodiment of the invention, in a modified second step which replaces the second step, the second overvoltage value is determined as a maximum value of the measuring voltage over a complete switching cycle of the switching controller, wherein such a switching cycle is defined by the time between the start of a first closing of the first switching element and the start of a subsequent second closing of the first switching element. In this form of embodiment of the invention, the third and fourth steps of the method can then be omitted, if the second overvoltage value is smaller than or equal to a predefined overvoltage limiting value.

Although, in this form of embodiment of the invention, the at least approximate establishment of an at least locally optimum dead time value can no longer be guaranteed, this form is sufficient for many practical purposes, if a predefined overvoltage limiting value is not significantly exceeded. For such application purposes, this form of embodiment constitutes an advantageously simplified method on the grounds that, in this form of embodiment, the limitation of measurement of the overvoltage characteristic to a predefined measuring time window which is tailored to the current dead time value can be omitted. Advantageously, a simpler arrangement for the measurement of an overvoltage value can thus be applied.

In a further form of embodiment of the invention, the overvoltage limiting value is determined in relation to a predefined target value for the measuring voltage. In many significant applications, electrical consumers can receive supply voltages which lie within a certain corridor, in relation to a target supply voltage. For example, variations of plus or minus ten percent of the target supply voltage can be tolerated by electrical consumers of this type. In these cases, therefore, it is not necessary to limit the overvoltage on the measuring output of a switching power supply unit to a minimum value, but only to prevent any overshoot of the acceptable corridor of supply voltage values. For example, it is thus possible to define an overvoltage limiting value which corresponds to 1.05 times the target value of the measuring voltage, if it is known that the consumer tolerates variations in the supply voltage equal to 10 percent on either side of the target value. Advantageously, the secure operation of consumers is thus possible, with a simultaneous minimization of the complexity of control of the dead time.

In a further form of embodiment of the invention, the dead time adjustment is determined from the difference between the first and second overvoltage values.

The dead time adjustment influences, firstly, the number of cycles of steps two to five which are required to achieve a dead time value which is close to the optimum dead time value. For the rapid adjustment of the dead time value, a large dead time adjustment is thus advantageous.

Secondly, the dead time adjustment influences the width of the interval within which, under stationary conditions, the dead time value determined by the method oscillates around such an optimum dead time value. For the accurate adjustment of the dead time value to this optimum value, a small dead time adjustment is thus advantageous.

For example, the dead time adjustment can determined as the product of the difference between the first and second overvoltage values, with a predefined positive factor. At a wide margin from the desired optimum dead time value, an adjustment of dead time values will generate a large adjustment of the overvoltage values generated, and consequently a large dead time adjustment, thus resulting in a rapid approach to the desired optimum dead time value. At a close margin to the desired optimum dead time value, conversely, the variation of dead time values only results in a minor adjustment to the overvoltage values generated, and consequently a small dead time adjustment, thus resulting in an accurate adjustment of the dead time value to the desired optimum dead time value.

This form of embodiment of the invention thus advantageously combines a rapid rate of adjustment with a high degree of accuracy in the approach to this optimum dead time value.

The dead time adjustment can, moreover, be constituted as the product of a dead time adjustment increment, an amplification factor of at least one, and a control deviation in the measuring voltage, wherein the control deviation is constituted by the difference between the measured second overvoltage value and the preset measuring voltage target value. It is also possible for this control deviation to be raised to a higher power by an index of at least one. Advantageously, it is thus achieved that, in the case of comparatively large control deviations, a comparatively large dead time adjustment is also determined whereas, in the case of comparatively small control deviations, the dead time is only adjusted to a comparatively minor extent.

It is possible that the current load take-up of the consumer can change over time. Such a change in the current load generally results in a control deviation in the measuring voltage. In order to limit this control deviation, an adjustment of the dead time is required to prevent or restrict an unwanted overvoltage. If the amplification factor and/or index selected are too small, the control deviation may not be offset sufficiently rapidly. If the amplification factor and/or index selected are too large, a measuring voltage overdrive may be associated with an excessive adjustment of the dead time. A high capacitive impedance element on the consumer is also conducive to a measuring voltage overdrive, with a resulting time offset between the adjustment of the measuring voltage and the adjustment of the dead time.

In the form of embodiment of the method described, the amplification factor and the index are thus advantageously adapted to the typical switching behavior of a connected consumer, specifically to the typical speed and typical amplitude of a change in the current load take-up, and to the capacitive impedance element of the connected consumer. For the adjustment, an amplification factor and an index for a specific consumer are determined which, in the event of typical variations in the current load take-up, will generate no overdrive of the measuring voltage, and consequently of the supply voltage.

In a further form of embodiment of the method, in the second step, the second overvoltage value is defined as the maximum measuring voltage value over a complete switching cycle of the switching controller, wherein a switching cycle of this type is defined by the time between the start of a first closing of the first switching element and the start of a subsequent second closing of the first switching element.

In this form of embodiment of the invention, the third and fourth steps of the method are executed, if the second overvoltage value is greater than a predefined overvoltage limiting value.

If, in a subsequent cycle of the method, the second overvoltage value is equal to or lower than the predefined overvoltage limiting value, a modified fourth step is executed in place of the third and fourth steps.

In this modified fourth step, the dead time is adjusted in the corrective direction by a multiple of the dead time adjustment increment which is dictated by a predefined step number. In other words: if the dead time adjustment has achieved the desired undershoot of the overvoltage limiting value, in a subsequent cycle of the method, the dead time is again adjusted in the same corrective direction by a predefined multiple of the dead time adjustment increment, which is defined as the product of the dead time adjustment increment and a step number.

In this embodiment, the third and fourth steps can be omitted from all subsequent cycles of the method, if the second overvoltage value is smaller than or equal to the predefined overvoltage limiting value. In other words: the dead time remains unchanged, until a further overshoot of the overvoltage limiting value is detected.

Advantageously, in this form of embodiment of the invention, by a further adjustment of dead time in the direction of a previous successfully executed dead time adjustment, a further reduction in the control deviation can be achieved if, by the selection of the step number, this dead time adjustment is adapted to the typical switching behavior of the consumer supplied. Adjustment can be executed in a similar manner to the adjustment of the amplification factor and index, by the selection of step number which, in the event of typical variations in the current load take-up, will not cause any overdrive of the measuring voltage.

The device according to the invention for the definition and adjustment, specifically for the regulation or control of the dead time by the method according to the invention, comprises a measuring unit for the measurement of the measuring voltage on the switching power supply unit, a processing unit for the calculation of a dead time, and a control unit for the control of the first and second switching elements in the switching controller of the switching power supply unit.

The measuring unit is connected to the processing unit, and measures the measuring voltage across the second switching element. From this measuring voltage, the processing unit determines the requisite adjustment of the dead time value, by the method according to the invention.

The processing unit is connected to the control unit and is designed, via a link, to transmit a control signal to the control unit from which the required dead time adjustment can be deduced.

The control unit is connected to the first and second switching elements. The control unit defines switching times for the switchover of the first and second switching elements, such that the resulting dead time between the opening of the first switching element and the closing of the second switching element, using the device according to the invention, advantageously minimizes or at least restricts an overvoltage on the measuring output of the switching power supply unit.

In a further form of embodiment of the device according to the invention, the control unit is designed to control MOSFETs. In this form of embodiment of the invention, the control unit is connected to switching elements configured as MOSFETs via electrical links. The control of especially customary switching controllers in switching power supply units can thus be advantageously achieved in a particularly simple and cost-effective manner.

BRIEF DESCRIPTION OF THE SEVERAL VIEWS OF THE DRAWING

Further details and exemplary embodiments of the invention are set out in greater detail below, with reference to the drawings.

Mutually corresponding elements are identified in all the figures by the same reference symbols.

DESCRIPTION OF THE INVENTION

Figure 1:
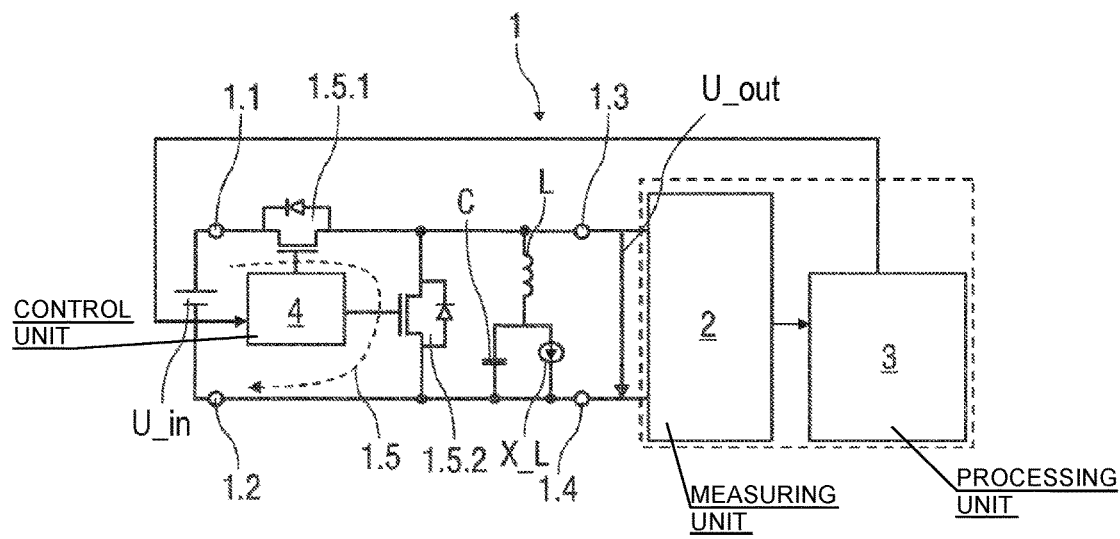
FIG. 1 shows a schematic circuit layout of a switching power supply unit, with dead time adjustment, e.g. control.

FIG. 1 shows an exemplary and schematic circuit layout of a switching power supply unit 1 with a measuring unit 2, a processing unit 3 and a control unit 4. The input of the switching power supply unit 1 comprises two input contacts 1.1, 1.2, which are supplied with a DC input voltage U_in. The measuring output of the switching power supply unit 1 comprises two measuring output contacts 1.3, 1.4, between which a measuring voltage U_out is present. The measuring voltage U_out should have a desired target value U_target, which lies below the DC input voltage U_in.

In an input-side switching controller 1.5 on the switching power supply unit 1 with active freewheeling, a first switching element 1.5.1 and a second switching element 1.5.2 are configured as MOSFETs and series-connected. The measuring output contacts 1.3, 1.4 are arranged in parallel to the second switching element 1.5.2. Moreover, between the measuring output contacts 1.3, 1.4, and thus parallel to the second switching element 1.5.2, an inductance L and a capacitance C are series-connected which, by the closing of the first switching element 1.5.1, are charged by the DC input voltage source U_in. In parallel with the capacitance C, a consumer or load resistance X_L is supplied with the supply voltage, via which the capacitance C is discharged.

The switching elements 1.5.1, 1.5.2 are periodically opened and closed by the action of the control unit 4 such that, between the opening of the first switching element 1.5.1 and the closing of the second switching element 1.5.2 a dead time t_dead occurs, during which the two switching elements 1.5.1, 1.5.2 are open.

It is possible for the first and second switching elements 1.5.1, 1.5.2 to be arranged on the same semiconductor chip.

The measuring unit 2 is connected to the measuring output 1.3, 1.4 of the switching power supply unit 1 and bonded to the processing unit 3. The processing unit 3 is bonded to the control unit 4. The control unit 4 controls the opening and closing of the switching elements 1.5.1, 1.5.2.

The switching elements 1.5.1, 1.5.2 and the connections of the switching controller 1.5 are electrically characterized by an ohmic resistance, a stray inductance and a stray capacitance.

Figure 2:
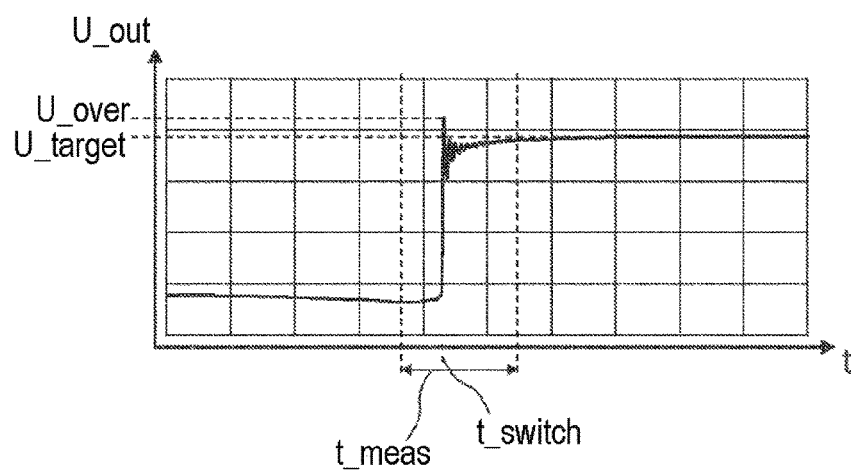
FIG. 2 shows a schematic overvoltage characteristic associated with an excessively long dead time.

In the event of a very long dead time t_dead, the stray inductances within the switching controller 1.5 cause an overshoot of the measuring voltage U_out, as represented in FIG. 2 by a switchover time t_switch along the time axis t. Within a measuring time window t_meas, on the measuring output 1.3, 1.4 of the switching power supply unit 1, an oscillation of the measuring voltage U_out is caused by induction, and thus an overshoot of the target value for the measuring voltage U_target is caused by the overvoltage U_over. Only upon the gradual decay of the oscillation in the overvoltage U_over will the target value of the measuring voltage U_target be established as the stationary value for the measuring voltage U_out.

Figure 3:
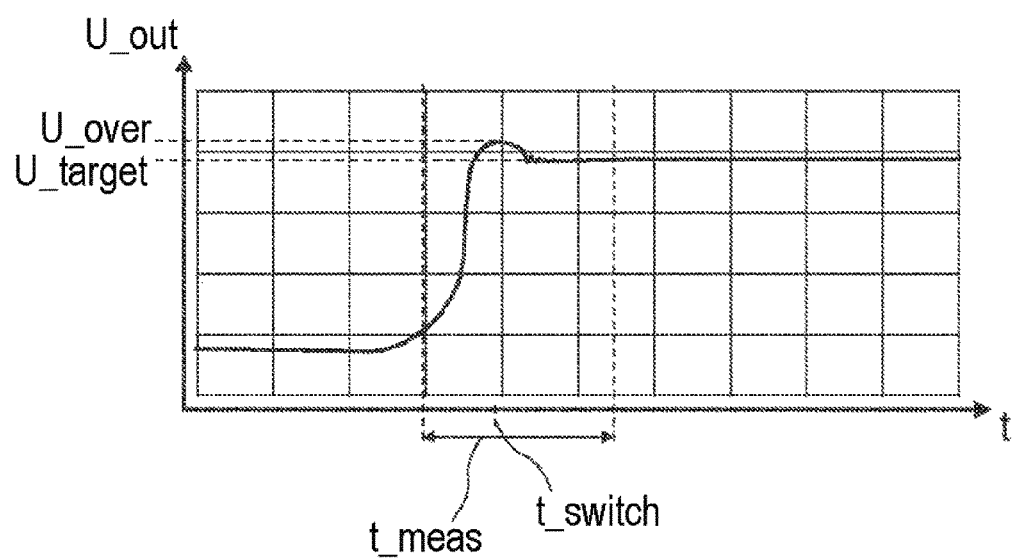
FIG. 3 shows a schematic overvoltage characteristic associated with an excessively short dead time.

Switching processes on the switching elements 1.5.1, 1.5.2 do not proceed abruptly, but rather, upon opening, during an opening phase, the current strength gradually decreases and, upon closing, during a closing phase, gradually increases. In the event of a very short dead time t_dead, the opening phase of the first switching element 1.5.1 and the closing phase of the second switching element 1.5.2 overlap. This results in an overshoot of the target value U_target of the measuring voltage, and thus an overvoltage U_over, as represented in FIG. 3.

Figure 4:
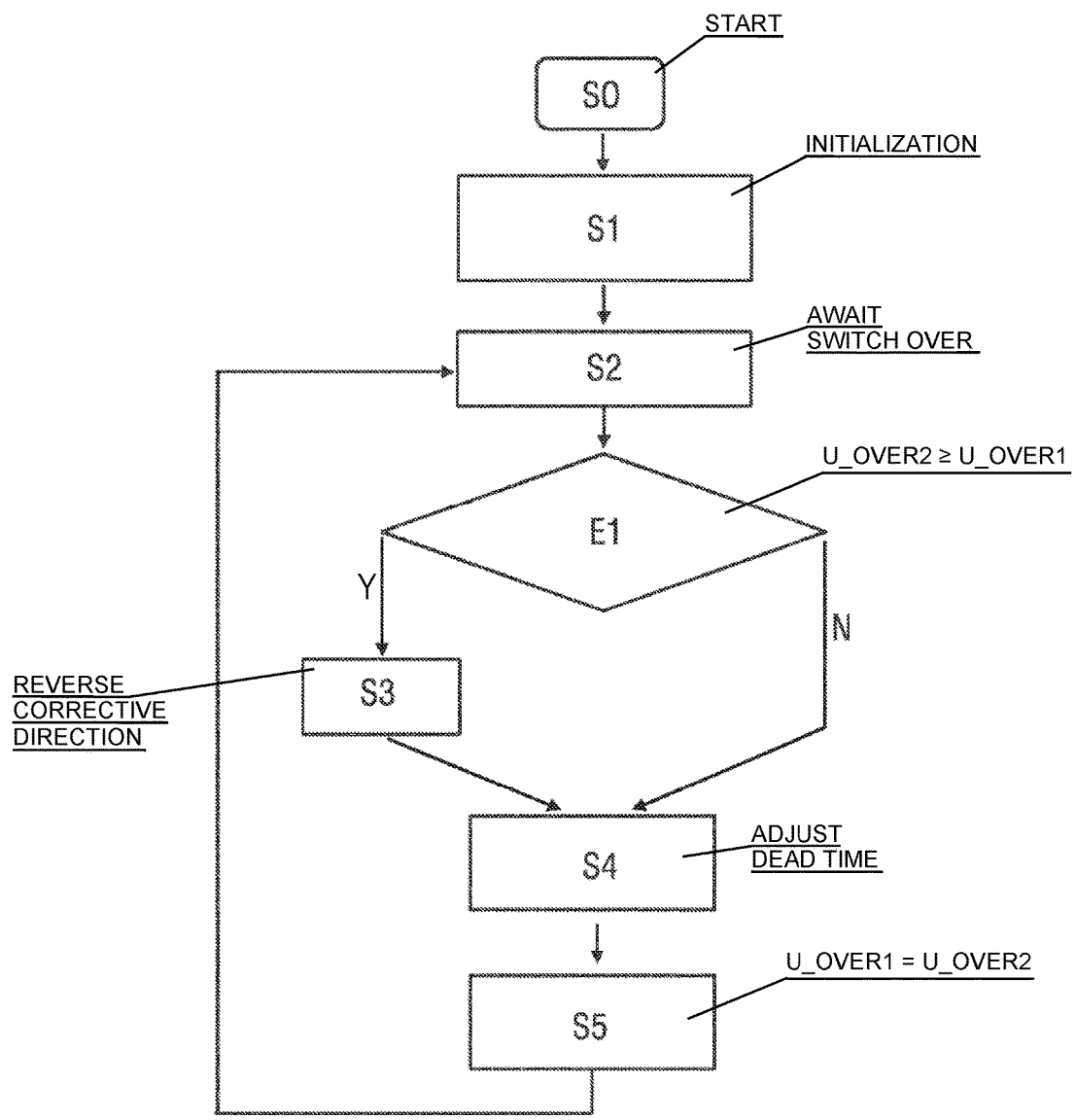
FIG. 4 shows the flow chart of a method for the minimization of the overvoltage by dead time regulation.

FIG. 4 shows the flow chart for the method according to the invention, by means of which the overvoltage U_over is minimized, or at least reduced. The method commences at a start point S0.

In a subsequent first step S1, the dead time t_dead is initialized to a value t_dead start, a first overvoltage value U_over1 to an overvoltage start value U_over start and a corrective direction d to a start value 1, by the formulae:

$$t\_dead := t\_dead\_start$$

$$d := 1,$$

wherein the operator := designates the referral of a right-hand value to a left-hand variable. Moreover, in a first step S1, a first overvoltage value U_over1 is measured in a measuring window t_meas between the switchover of the first switching element 1.5.1 and the switchover of the second switching element 1.5.2, as a maximum value of the measuring voltage U_out.

In a subsequent second step S2 of the method, a switchover is awaited between the first switching element 1.5.1 and the second switching element 1.5.2, i.e. at a time point or within a time span at or within which the first switching element 1.5.1 is already open and the second switching element 1.5.2 is not yet closed.

At this time point or within this time span, the current value of the measuring voltage U_out is measured, and a second overvoltage value U_over2 is determined therefrom.

For example, it is possible to determine a specific time point from the control signals generated by the control unit 4 for the first switching element 1.5.1 and the second switching element 1.5.2. The second overvoltage value U_over2 can then for example be measured at this time point as a value for the measuring voltage U_out.

However, it is also possible for the measuring voltage U_out to be measured within a predefined measuring time window t_meas, and to determine the second overvoltage value U_over2 as the maximum value of all the measured values for the measuring voltage U_out measured within this measuring time window t_meas.

In a subsequent first decision-making step E1, it is checked whether the second overvoltage value U_over2 is greater than or equal to the first overvoltage value U_over1.

If the second overvoltage value U_over2 is greater than or equal to the first overvoltage value U_over1, the corrective direction d is reversed in a third step S3, which succeeds the first decision-making step E1 in the positive flow path J, expressed by the formula:

$$d:=-d$$

and a fourth step S4 is executed thereafter.

If the second overvoltage value U_over2 is smaller than the first overvoltage value U_over1, the corrective direction d is maintained, and the fourth step S4 is executed directly after the first decision-making step E1, in accordance with the negative flow path N.

In the fourth step S4, the dead time t_dead is adjusted in the corrective direction by a dead time adjustment d_t_dead, expressed by the formula:

$$t\_dead:=t\_dead+d*d\_t\_dead.$$

In a subsequent fifth step S5, the second overvoltage value U_over2 is assigned to the first overvoltage value U_over1, expressed by the formula:

$$U\_over1:=U\_over2.$$

Thereafter, the method proceeds by the repetition of as many cycles of the second to fifth steps S2 to S5 as are required.

Figure 5:
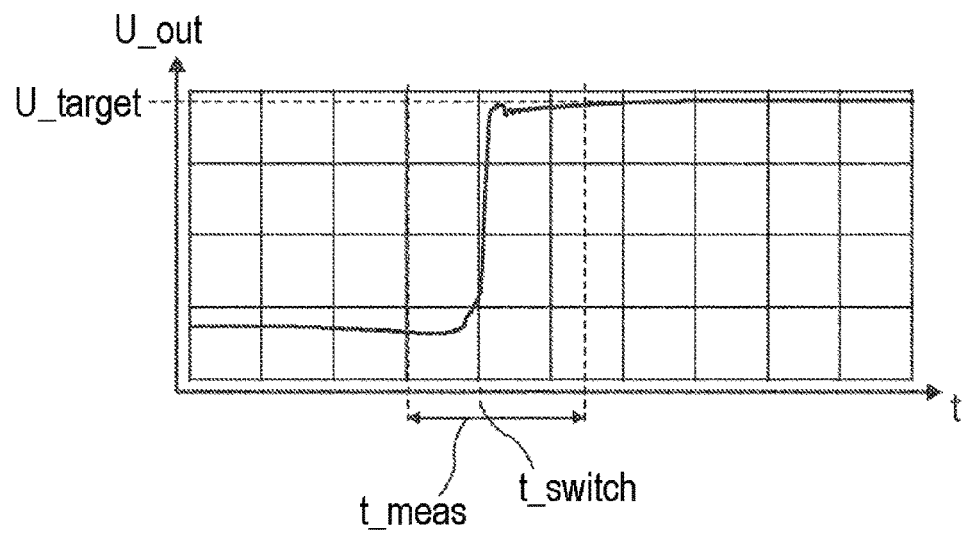
FIG. 5 shows the schematic overvoltage characteristic in a method for the minimization of the overvoltage by dead-time regulation.

Advantageously, by the method described, a dead time t_dead can be set which generates a minimum or close to a minimum second overvoltage value U_over2. Under stationary conditions, with an unchanged DC input voltage U_in and an unchanged consumer X_L on the measuring output 1.3, 1.4 of the switching power supply unit 1, the dead time t_dead oscillates around an optimum value, which is associated with a minimum overvoltage, and thus with a minimum overshoot of the measuring voltage U_out, which does not exceed the target value for the measuring voltage U_target, as represented in FIG. 5. Here again, the measuring voltage U_out gradually approaches the target value U_target, and achieves the latter in a steady-state condition.

Figure 6:
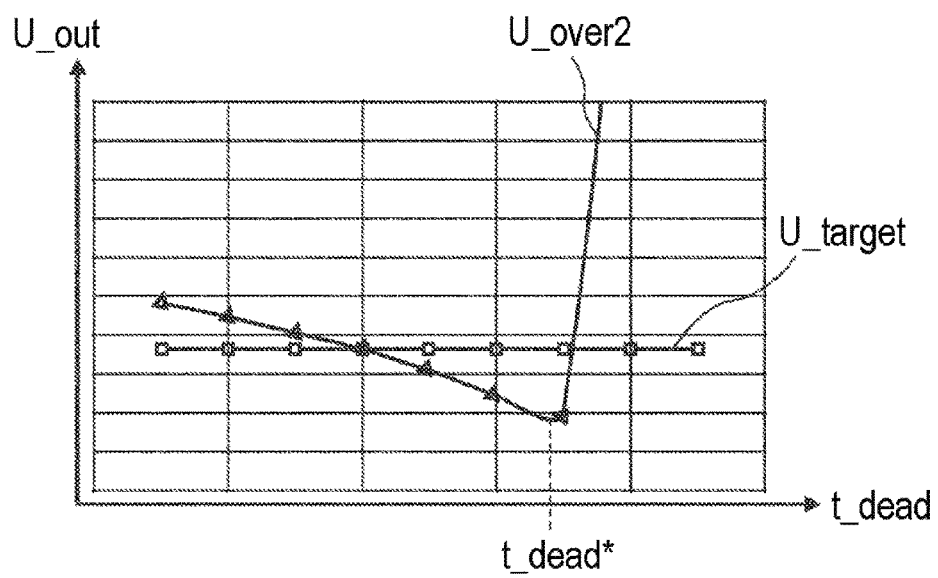
FIG. 6 shows the schematic detailed view of the overvoltage characteristic in a method for the minimization of the overvoltage by dead time regulation.

FIG. 6 shows a schematic characteristic of the overvoltage U_over, and the characteristic of the target value U_target of the measuring voltage U_out established in the stationary state, in relation to the dead time t_dead set. It can clearly be seen that a certain optimum value t_dead* exists for the dead time, at which the overvoltage U_over is at a minimum value. It can also clearly be seen that, at this optimum dead time t_dead* value, the overvoltage U_over lies below the target value U_target. Advantageously, the secure operation of both the switching power supply unit 1 and the connected consumer X_L is thus ensured.

Figure 7:
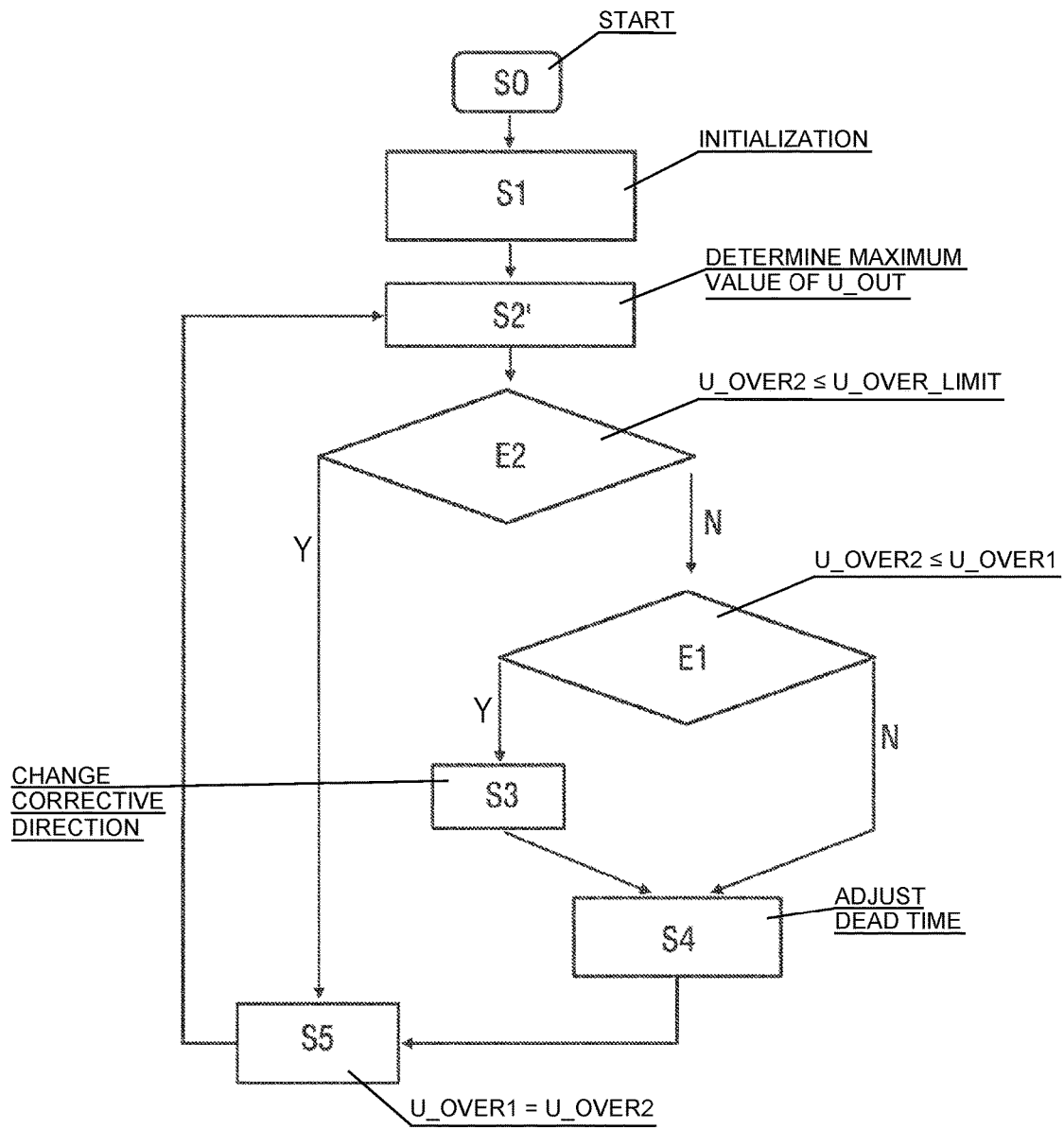
FIG. 7 shows the flow chart of a method for overvoltage limitation by dead time regulation.

FIG. 7 shows the flow chart for a form of embodiment of the method according to the invention, whereby the overvoltage U_over is limited. The method starts at a start point S0.

The sequence completed in the first step S1 corresponds to the sequence represented in FIG. 4.

In a subsequent modified second step S2', the maximum value of the measuring voltage U_out is determined over a switching cycle, and is considered with reference to the second overvoltage value, wherein such a switching cycle is defined as the time between the start of a first closing of the first switching element and the start of a subsequent second closing of the first switching element.

In a subsequent second decision-making step E2, it is checked whether the second overvoltage value U_over2 determined in step S2 is smaller than or equal to an overvoltage limiting value U_over_limit. If the second overvoltage value U_over2 determined in the modified second step S2' is smaller than or equal to the overvoltage limiting value U_over_limit, the fifth step S5 is executed as the next step along the positive flow path J. If the second overvoltage value U_over2 determined in the modified second step S2' is greater than the overvoltage limiting value U_over_limit, the sequence proceeds to the first decision-making step E1 along the negative flow path, whereafter optionally the third step S3 or the fourth step S4 are selected, as already described with reference to FIG. 4.

In the first decision-making step E1, it is checked whether the second overvoltage value U_over2 is smaller than or equal to the first overvoltage value U_over1.

If the first overvoltage value U_over1 is smaller than or equal to the second overvoltage value U_over2, the corrective direction d is changed in the subsequent third step S3, which proceeds by the selection of the positive flow path J, expressed by the formula:

$$d:=-d$$

and the fourth step S4 is executed thereafter.

If the first overvoltage value U_over1 is greater than the second overvoltage value U_over2, the corrective direction d is maintained, and the fourth step S4 is executed immediately after the first decision-making step E1, in the negative flow path N.

In the fourth step S4, the dead time t_dead is adjusted in the corrective direction d by a dead time adjustment increment d_t_dead, expressed by the formula:

$$t\_dead:=t\_dead+d*d\_t\_dead.$$

In one form of embodiment of the invention, the dead time adjustment increment d_t_dead can additionally be multiplied by an amplification factor K of at least 1, and a control deviation between the second overvoltage value U_over2 and the target value of the measuring voltage U_target raised to a higher power by a positive index x, expressed by the formula:

$$t\_dead:=t\_dead+d*K*(U\_over2-U\_target)^x$$

where $y^x$ is the value of y, raised to the $x^{th}$ power.

Advantageously, in this form of embodiment of the invention it is possible to apply a comparatively large adjustment of the dead time t_dead in case of a large control deviation, and a comparatively small adjustment of the dead time t_dead in case of a small control deviation. Thus, in a limited number of cycles of the fourth step S4, with a near-equivalent control accuracy, a near-optimum dead time t_dead setting can be achieved as in a method with a fixed increment, which remains constant regardless of the deviation between the last measured second overvoltage value U_over2 and the measuring voltage target value U_target.

Actual values for the amplification factor K and the index x are advantageously selected according to the impedance and switching behavior of the connected consumer X_L. Comparatively large values for the amplification factor K result in the more rapid adjustment of the dead time t_dead, and thus a more rapid reduction in the control deviation, than comparatively low values for the amplification factor K. However, an overshoot of the measuring voltage U_out can occur, if the amplification factor K exceeds a certain limiting value. Advantageously, the amplification factor K is selected within a range of approximately 1 to approximately 10.

By means of the index x, non-linearity in the regulation of the measuring voltage U_out can be controlled. If the index x exceeds 1, an over-proportionate adjustment of the dead time t_dead will occur in case of large control deviations. Thus, advantageously, a comparatively more rapid reduction of the control deviation is achieved than by the application of an index x of 1. However, an overshoot of the measuring voltage U_out can occur, if the index x exceeds a certain limiting value. Advantageously, the index x is selected from a range of approximately 1 to approximately 5.

For a given consumer X_L, with a given impedance and a given switching behavior, which describes the frequency, speed and amplitude of load variations, it is possible to determine particularly appropriate values for the amplification factor K and the index x by experimentation. For example, the amplification factor K and the index x can firstly be increased, until an overshoot of the measuring voltage U_out is observed. Thereafter, the values thus established are reduced by a predefined magnitude, in order to achieve the secure operation of the method with no overshoot of the measuring voltage U_out.

In the fifth step S5, which succeeds either the fourth step S4 or the second decision-making step E2, the second overvoltage value U_over2 is considered with reference to the first overvoltage value U_over1, as expressed by the formula:

$$U\_over1 := U\_over2.$$

Thereafter, the method proceeds by as many repetitions of the cycle from the second to fifth steps S2 to S5 as are required.

Advantageously, in this form of embodiment of the method according to the invention, it is possible to select a dead time t_dead such that the overvoltage limiting value U_over_limit is not significantly exceeded. Immediately an overshoot of this overvoltage limiting value U_over_limit is observed, in the second decision-making step E2, the dead time t_dead is adjusted in the corrective direction d, such that a reduction in the measured second overvoltage value U_over2 occurs. The adjustment of the dead time t_dead is suspended immediately the overvoltage limiting value U_over_limit is achieved or undershot, and is only resumed if the overvoltage limiting value U_over_limit is exceeded once more. Advantageously, in this form of embodiment of the method, the necessity for the continuous monitoring of a measuring time window between the switchover of the first switching element 1.5.1 and the switchover of the second switching element 1.5.2, during which the maximum value of the voltage characteristic of the measuring voltage U_out is to be recorded on the measuring output of the switching controller 1.5, is dispensed with. This form of embodiment of the method can thus be executed with reduced complexity in respect of components, such as e.g. comparators.

Figure 8:
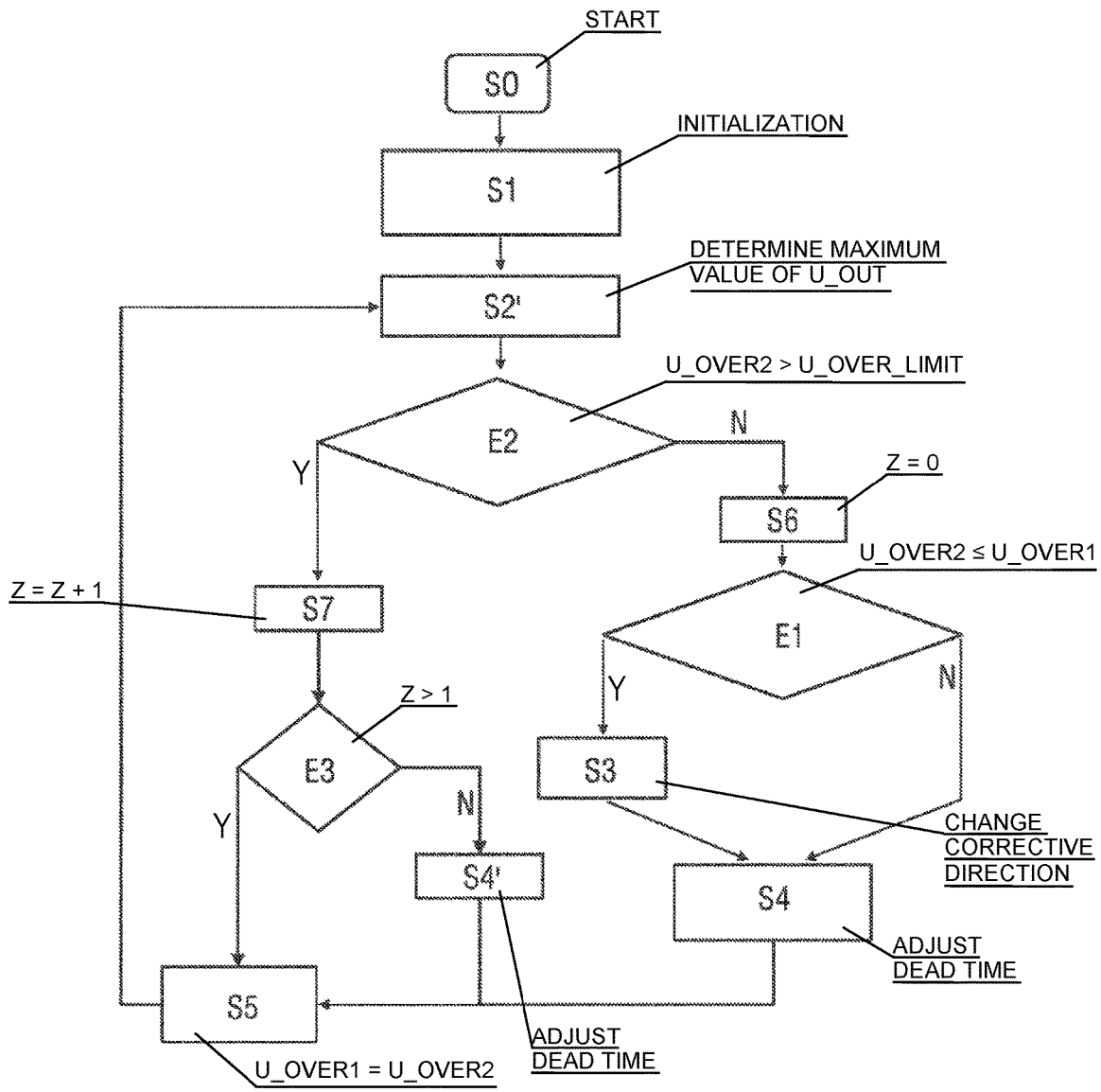
FIG. 8 shows the flow chart of a method for overvoltage limitation by dead time regulation and dead time control.

FIG. 8 shows the flow chart for a further form of embodiment of the method, in which the overvoltage U_over is limited. The method commences at a start point S0. The first step S1, the modified second step S2' and the second decision-making step E2 are executed in a similar manner to the form of embodiment of the method described in FIG. 7. If the second overvoltage value U_over2 determined in the modified second step S2' is greater than the overvoltage limiting value U_over_limit, a sixth step S6 succeeds in the negative flow path N, in which an iteration number Z is set to 0, as expressed by the formula:

$$Z := 0.$$

The iteration number Z describes how often the method has been executed since the last overshoot of the predefined overvoltage limiting value U_over_limit.

After the sixth step S6, the sequence of the first decision-making step E1 and optionally the third step S3 and the fourth step S4 is selected in the manner already described with reference to FIG. 4.

In the first decision-making step E1, it is checked whether the second overvoltage value U_over2 is smaller than or equal to the first overvoltage value U_over1.

If the first overvoltage value U_over1 is smaller than or equal to the second overvoltage value U_over2, the corrective direction d is changed in the subsequent third step S3 by proceeding along the positive flow path J, expressed by the formula:

$$d := -d$$

and the fourth step S4 is executed thereafter.

If the first overvoltage value U_over1 is greater than the second overvoltage value U_over2, the corrective direction d is maintained and the fourth step S4 proceeds immediately after the first decision-making step E1, along the negative flow path N.

In the fourth step S4, the dead time t_dead is adjusted in the corrective direction d by the dead time adjustment increment d_t_dead, expressed by the formula:

$$t\_dead := t\_dead + d * d\_t\_dead.$$

In one form of embodiment of the invention, the dead time adjustment increment d_t_dead can also be multiplied by an amplification factor K of at least 1 and a control deviation between the second overvoltage value U_over2 and the measuring voltage target value U_target raised to a higher power by a positive index x, expressed by the formula:

$$t\_dead := t\_dead + d * K * (U\_over2 - U\_target)^x$$

where $y^x$ represents the value of y, raised to the $x^{th}$ power.

Further to the fourth step S4, the fifth step S5 is executed, as already described with reference to FIG. 4, and the modified second step S2' proceeds thereafter.

If the second overvoltage value U_over2 determined in the modified second step S2' is smaller than or equal to the overvoltage limiting value U_over_limit, a seventh step S7 is executed further to the second decision-making step E2, in which the iteration number Z is incrementally increased, expressed by the formula:

$$Z := Z + 1.$$

In a third decision-making step E3, further to the seventh step S7, it is checked whether the iteration number Z is greater than 1. If the iteration number Z is greater than 1, the fifth step S5 is executed as the next step along the positive flow path J, as already described with reference to FIG. 4, and the modified second step S2' proceeds thereafter.

If it is determined in the third decision-making step E3 that the iteration number Z is not greater than 1, a modified fourth step S4' is executed as the next step along the negative flow path N. In the modified fourth step S4', the dead time t_dead is adjusted in the corrective direction d by the dead time adjustment increment d_t_dead, multiplied by a predefined step number n, expressed by the formula:

$$t\_dead := d * n * d\_t\_dead.$$

In other words, in this form of embodiment of the method, in a cycle which follows the adjustment of the dead time t_dead in the fourth step S4, a further adjustment of the dead time t_dead is undertaken in the same direction, by a predetermined magnitude n*d_t_dead.

By the adaptation of the predefined step number n to the switching behavior of a consumer X_L, it is possible to select the magnitude of said further adjustment to the dead time t_dead such that, in the event of typical variations in the current load take-up of the consumer X_L, a near-minimum overvoltage U_over is achieved.

Further to the modified fourth step S4', the fifth step S5 is executed, as already described with reference to FIG. 4, and the modified second step S2' proceeds thereafter.

If it is established in the third decision-making step E3 that the iteration number Z is greater than 1, the fifth step S5 is executed as the next step, as already described with reference to FIG. 4, proceeding along the positive flow path J, and the modified second step S2' proceeds thereafter.

Advantageously, the form of embodiment of the method represented in FIG. 8 permits a particularly rapid and simultaneously stable reduction of a control deviation in the event of a load variation, with no continuous measurement of the measuring voltage U_out, if the switching behavior of a consumer X_L supplied is definable in advance. Exceptionally simple and stable switching power supply units can thus be developed which, by the adjustment of the amplification factor K and/or of the index x and/or of the step number n, can be easily adapted for the supply of consumers X_L with different, but known switching behaviors.

LIST OF REFERENCE SYMBOLS

1 Switching power supply unit
1.1, 1.2 Input contacts
1.3, 1.4 Measuring output contacts, measuring output
1.5 Switching controller
1.5.1 First switching element
1.5.2 Second switching element
2 Measuring unit
3 Processing unit
4 Control unit
X_L Load resistance, consumer
C Capacitance
L Inductance
U_in DC input voltage
U_out Measuring voltage
U_target Target measuring voltage
U_over Overvoltage
t Time, time axis
t_dead Dead time
t_dead* Optimum dead time
t_switch Switchover time
t_meas Measuring time window
S0 Start point
S1 to S7 First to seventh steps
S2' Modified second step
S4' Modified fourth step
E1, E2, E3 First to third decision-making steps
J Positive flow path
N Negative flow path

The invention claimed is:

1. A method of adjusting a dead time between a start of opening a first switching element and a start of closing a second switching element that is connected in series with the first switching element in a switching power supply unit, the method comprising:
  measuring a measuring voltage across the second switching element, wherein the step of measuring the voltage includes measuring a first overvoltage value of the measuring voltage and a second overvoltage value of the measuring voltage;
  comparing the second overvoltage value of the measuring voltage with the first overvoltage value of the measuring voltage and in response to the comparison, varying the dead time to thereby minimize or limit a measured measuring voltage control deviation relative to a measuring voltage target value; and
  controlling the first and second switching elements with the dead time thus determined.

2. The method according to claim 1, wherein the step of varying the dead time includes:
  in a first step, initializing the dead time, initializing the first overvoltage value of the measuring voltage, with an overvoltage start value greater than or equal to a maximum measurable overvoltage, and initializing a corrective direction for dead time adjustment;
  in a second step, measuring the second overvoltage value of the measuring voltage within a measuring time window within the dead time;
  in a third step, reversing the corrective direction, if the second overvoltage value is greater than the first overvoltage value;
  in a fourth step, adjusting the dead time, in the corrective direction, by the dead time adjustment; and
  in a fifth step, overwriting the first overvoltage value by the second overvoltage value; and
  repeating a sequence of the second step to the fifth step at least once.

3. The method according to claim 2, which comprises determining the dead time adjustment by a multiplication of a difference between the first overvoltage value and the second overvoltage value with a dead time adjustment increment.

4. The method according to claim 2, which comprises forming the dead time adjustment as a product of:
  an amplification factor of at least 1;
  a difference between the second overvoltage value and the target value of the measuring voltage raised to a higher power by an index of at least one; and
  a dead time adjustment increment.

5. The method according to claim 4, wherein the amplification factor is selected within a range from 1 to 12, and the index is selected within a range from 1 to 5.

6. The method according to claim 1, wherein the step of varying the dead time includes:
  in a first step, initializing the dead time, initializing the first overvoltaqe value of the measuring voltage, with an overvoltaqe start value greater than or equal to a maximum measurable overvoltaqe, and initializing a corrective direction for dead time adjustment; and in a second step, measuring the second overvoltage value as a maximum value of the measuring voltage over a complete switching cycle, and, upon determining that the second overvoltage value is smaller than or equal to an overvoltaqe limiting value, overwriting the first overvoltage value by the second overvoltaqe value; and repeating the second step at least once.

7. The method according to claim 6, which comprises determining the overvoltage limiting value from the target value for the measuring voltage by a multiplication thereof with a tolerance factor of at least 1.

8. The method according to claim 6, which comprises:

executing a modified fourth step if the second overvoltage value is smaller than or equal to the overvoltage limiting value and if, in a previous cycle of the method, the second overvoltage value was greater than the overvoltage limiting value; and in the modified fourth step, adjusting the dead time in the corrective direction by a dead time adjustment increment which is multiplied by a predefined step number of at least 1.

9. The method according to claim 8, which comprises selecting the predefined step number within a range of 12 to 21.

10. A device for adjustment of the dead time by the method according to claim 1, the device comprising:

a measuring unit for said measuring of the measuring voltage on the switching power supply unit, the measuring voltage including a first overvoltage value of the measuring voltage and a second overvoltage value of the measuring voltage;

a processing unit to be connected to said measuring unit, said processing unit being configured for calculating a dead time value, said processing unit also configured for comparing the second overvoltage value of the measuring voltage with the first overvoltage value of the measuring voltage and in response to the comparison, varying the dead time to thereby minimize or limit a measured measuring voltage control deviation relative to a measuring voltage target value; and a control unit to be connected to said processing unit, said control unit being configured for controlling the first and second switching elements in the switching controller of the switching power supply unit.

11. The device according to claim 10, wherein the first and second switching elements are metal oxide semiconductor field effect transistors, and said control unit is configured for controlling said metal oxide semiconductor field effect transistors.

12. In a switching controller of a switching power supply unit having a first switching element and a second switching element connected in series with the first switching element, a device of adjusting a dead time between a start of opening the first switching element and a start of closing the second switching element, the device comprising:

a measuring unit for measuring a measuring voltage across the second switching element, the measuring voltage including a first overvoltage value of the measuring voltage and a second overvoltage value of the measuring voltage;

a processing unit connected to said measuring unit, said processing unit being configured for calculating a dead time value, said processing unit also configured for comparing the second overvoltage value of the measuring voltage with the first overvoltage value of the measuring voltage and in response to the comparison, varying the dead time to minimize or limit a measured measuring voltage control deviation relative to a measuring voltage target value; and a control unit connected to said processing unit, said control unit being configured for controlling the first and second switching elements in the switching controller of the switching power supply unit with the dead time thus determined.

13. The device according to claim 12, wherein the first and second switching elements are metal oxide semiconductor field effect transistors, and said control unit is configured for controlling said metal oxide semiconductor field effect transistors.

* * * * *